(No Model.)  2 Sheets—Sheet 1.
A. FERRARI.
GLASS FURNACE.
No. 330,307. Patented Nov. 10, 1885.
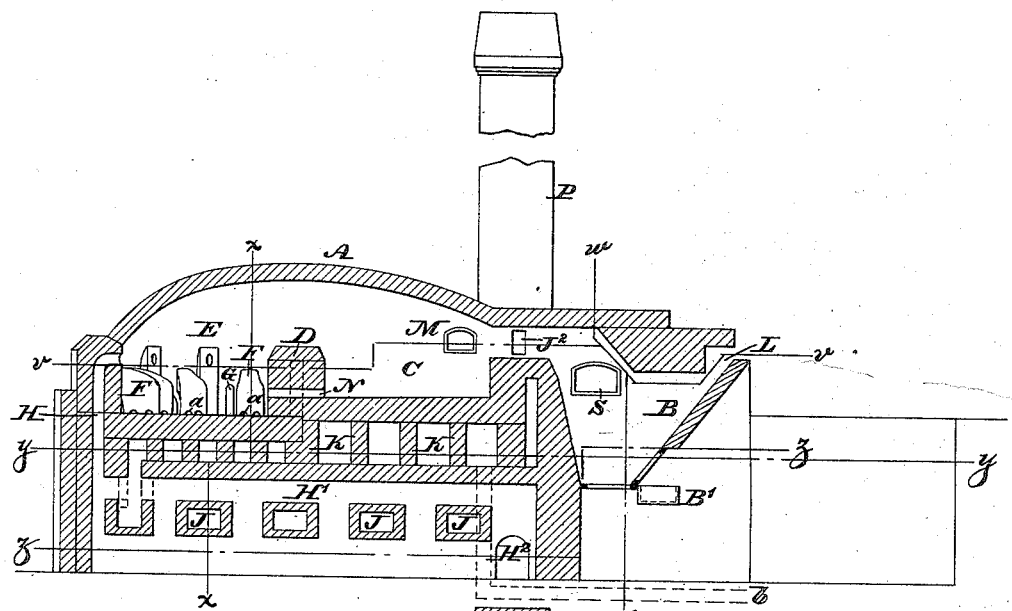
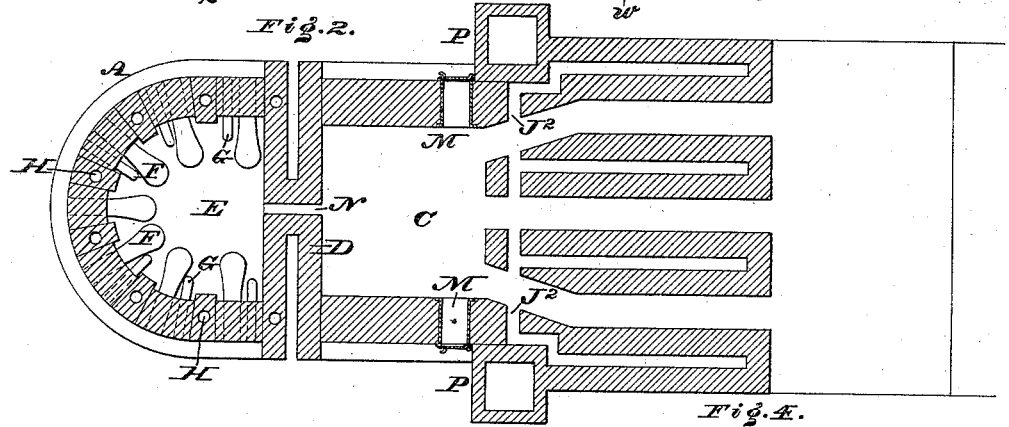
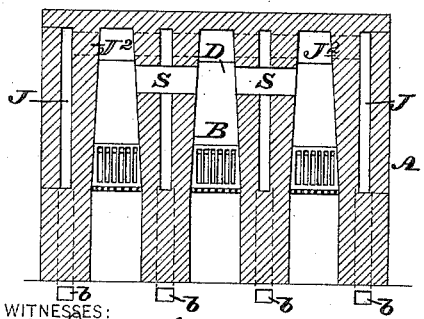
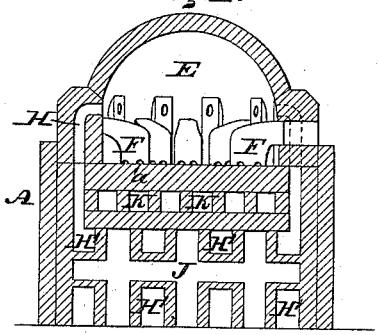
WITNESSES:
L. Douville
W. F. Kircher
INVENTOR:
Andrew Ferrari
BY John A. Wiedersheim
ATTORNEY.

(No Model.) 2 Sheets—Sheet 2.
A. FERRARI.
GLASS FURNACE.
No. 330,307. Patented Nov. 10, 1885.
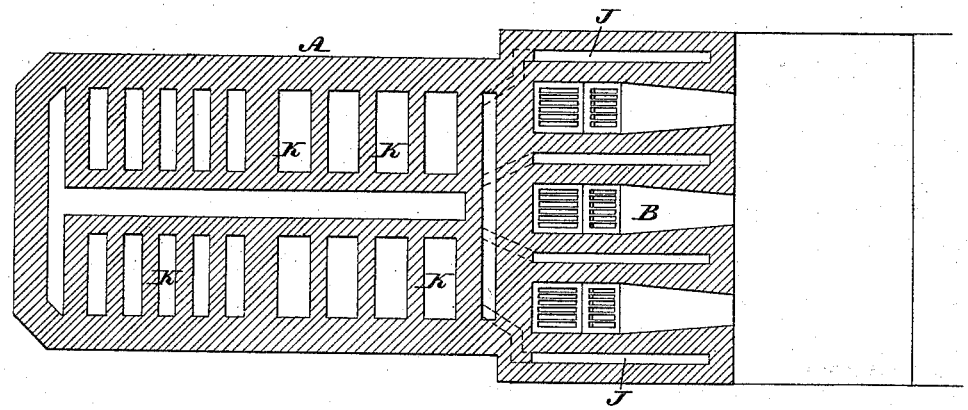
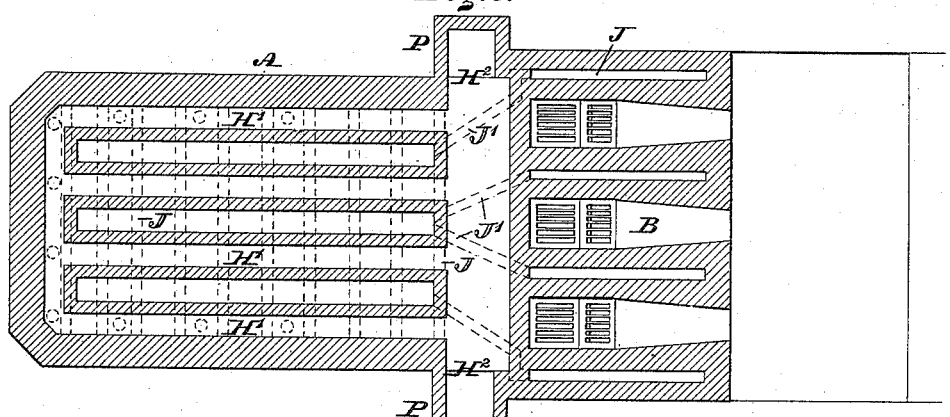
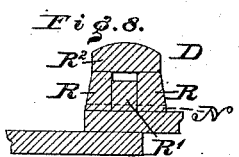
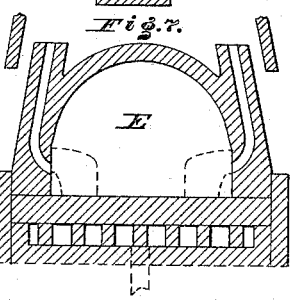
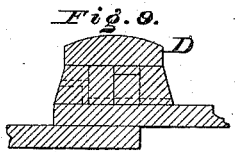
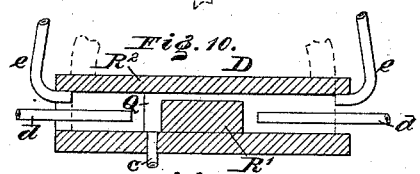
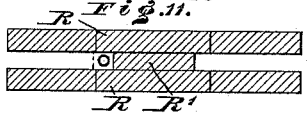
WITNESSES: INVENTOR:
L. Douville Andrew Ferrari
W. F. Kircher John A. Diedersheim
 BY ATTORNEY.

UNITED STATES PATENT OFFICE.

ANDREW FERRARI, OF GLASSBOROUGH, NEW JERSEY, ASSIGNOR TO WHITNEY BROTHERS, OF SAME PLACE.

GLASS-FURNACE.

SPECIFICATION forming part of Letters Patent No. 330,307, dated November 10, 1885.

Application filed March 31, 1885. Serial No. 160,759. (No model.)

*To all whom it may concern:*

Be it known that I, ANDREW FERRARI, a subject of Germany, residing at Glassborough, in the county of Gloucester, State of New Jersey, have invented a new and useful Improvement in Glass-Furnaces, which improvement is fully set forth in the following specification and accompanying drawings, in which—

Figure 1 represents a central longitudinal vertical section of a glass-furnace embodying my invention. Fig. 2 represents a horizontal section in line $v\ v$, Fig. 1. Fig. 3 represents a transverse section in line $w\ w$, Fig. 1. Fig. 4 represents a transverse section in line $x\ x$, Fig. 1. Fig. 5 represents a horizontal section. Fig. 6 represents a horizontal section in line $z\ z$, Fig. 1. Fig. 7 represents a transverse vertical section of a modification where the old style of stack is used, and which may be placed in furnaces as at present constructed. Figs. 8, 9, 10, and 11 represent detached portions of the apparatus.

Similar letters of reference indicate corresponding parts in the several figures.

My invention consists of the construction of a glass furnace and tank in which the operation may be carried on continuously.

It also consists of the peculiar construction and distribution of the air and steam flues.

It further consists of a double set of retorts of different sizes for the purposes to be hereinafter set forth.

It also consists of details of construction, as will be hereinafter fully set forth.

Referring to the drawings, A represents the body of a glass-furnace, and B represents the combustion chamber or furnace thereof.

C represents the charging-tank, which at one end is in communication with the chamber B, and has at the opposite end a bridge, D, which separates it from the glass-receiving chamber E.

F G represent retorts within the chamber E, having inlets $a$.

H H' H² represent flues for the products of combustion, and J and K represent flues for air and steam to be directed into the chamber B. The flues H are vertical, and begin in the chamber E above the retorts and pass through the floor of the said chamber to the flues H' below said floor, said flues H' extending horizontally toward the front, where they join the flues H², the latter extending vertically and reaching the smoke-stack. The flues K are in communication with the flues J, and discharge into the furnace between the combustion-chamber and tank, a pipe, $b$, being employed and connected with said flues K for air and steam conveying purposes.

The body A has a door or opening, L, for supplying the chamber B with fuel, and also openings M, for supplying the tank C with glass-making materials. In the bridge D is a passage, N, which forms communication between the tank C and chamber E.

The operation is as follows: The tank is properly supplied with material for making glass, and fire made in the chamber or furnace B, the heat passing therefrom into the tank C, and acting on the material therein to melt the same. The bridge D acts as a barrier, serving to prevent the heat passing directly into the chamber E. As the glass melts and sinks to the bottom of the tank, it enters the passage N, and thus reaches the retorts F G, it being noticed that said retorts have at their bases, where they rest on the floor of the chamber E, small openings or ducts $a$, through which the molten glass may enter, the glass then rising in the retorts and openings at the side of the body through which the glass may be removed. The retorts G are smaller than the retorts F, and are adapted to receive and heat the irons, so that there is no obstruction at any time to the removal of the molten glass from the retorts F by the irons, as the latter need not be introduced in said retorts F. The products of combustion leaving the chamber E enter the flues H H' H², and so reach the smoke-stack P, thus heating the portions of the furnace which forms the bed of the tank C and chamber E, and utilizing the products of combustion for such purpose, instead of passing them out of the furnace at the chamber E. The pipes $b$ direct air and steam to the flues K, beneath the tank C, the same then passing to the flues J, and then through the flues J', by which they are directed to the furnace B and discharged therein, as at J², so that there is a constant supply of hot air and steam admitted to the fire for increasing combustion.

B' represents a receptacle for water, which is located in front of the grate of the combustion-chamber B, whereby the vapor rising from the water is drawn into said chamber, and as it passes through the fuel it generates gas, which is consumed with the fuel, thus increasing the temperature of the heat. As the flame passes from the chamber B into the tank, it has admitted to it superheated steam and air through the flues K, as above stated, thus further increasing the heat in the tank C.

The bridge D, between the tank C and chamber E, is constructed as follows, (see Figs. 7, 8, 9, 10, and 11:) Between two rows of walls, made of the best fire-clay, there is placed a box, Q, of rolled iron or other suitable metal. The center partitions, R R' R$^2$, are built of three well-fitted stones, and through these the passage N is made. In order to obtain an equal circulation of cold air inside of the flues in the bridge, a tube, c, is employed, the same conducting air around the stone R'. Tubes d are also employed for passing air from the outside to the stone R' on one side and the iron box on the other side, the air then returning through the tubes e to the atmosphere. The box Q covers the joints of the masonry, thus preventing the escape of molten glass, excepting through the proper channel.

Owing to the net-work of flues employed by me the air and steam which enter the flues K are of much lower temperature than said flues, and serve to cool the same, and as the products of combustion pass around said flues K, and also around the flues J, said air and steam are superheated, in which condition they are directed with radiated heat into the combustion-chamber, as at J$^2$, and there united with the products of combustion and consumed, as hereinbefore stated.

Among other advantages of my invention are the distribution and combustion of gases, instead of the rapid exit and loss of the same, the thorough purification of the glass, as it is not spoiled by stones, ashes, &c., the prevention of the cooling of the glass, whereby it does not fly from the pipes, and a better and cheaper quality of glass. Furthermore, the operation of making glass may be carried on continuously, as the tank C may be readily supplied with glass-making material or batch, the glass as made passing through the passage N into the chamber E, reaching the inlets a of the retorts, and entering the latter where it is readily accessible and removable, the feeding of the tank being accomplished without disturbing the fire or materially affecting the temperature of the chamber E.

The several fire-chambers B are in communication by means of passages S, by means of which the several fire-chambers or gas-producers B, which are placed side by side, are in communication, whereby the gas may be equally distributed, and is permitted to pass from one producer to the other in case that the supply of hot air furnished to such producers is not sufficient to properly consume the gas generated.

The gas-producers are secured directly to the furnace at the combustion-chamber thereof, and in a measure form the walls thereof, whereby the gas is highly heated therefrom and admitted in such condition to the furnace, where it may be immediately consumed. This renders the so-called regenerator unneccessary, and avoids the complication and expense thereof, and prevents accidents incident to regulator-valves, &c., heretofore employed.

Having thus described my invention, what I claim as new, and desire to secure by Letters Patent, is—

1. A glass-furnace having retorts and chambers for warming the tools, said retorts and chambers being grouped in pairs, substantially as described.

2. A glass-furnace having in the glass-receiving chamber a series of flues having openings above the retorts, and being in communication with a series of flues beneath said chamber, the former series of flues being in communication with the fire-chamber, and the latter series of flues in communication, by means of a transverse flue, with the smoke-stack, whereby the products of combustion are placed above and below the bed or floor of said chamber, substantially as described.

3. A glass-furnace having a fire-chamber, a batch-holding tank, and a glass-receiving chamber, the latter chamber having flues for directing the products of combustion from said chamber or flues below the floor or bed thereof, and below the floor or bed of said tank, and thence to the smoke-stack, substantially as described.

4. A glass-furnace having below its bed or floor flues for the products of combustion, and flues for the admission of air or steam, or both, which is or are directed into the flame in or near the fire-chamber, substantially as described.

5. A glass-furnace having beneath the batch-holding tank and the glass receiving or retort chamber a net-work of flues for the passage of the products of combustion and admission of air or steam, or both, to the fire-chamber, whereby the beds or floors of said tank and chamber and the flues for air and steam are heated by the products of combustion as they are directed to the smoke-stack, substantially as described.

6. The bridge D, formed of partitions R R' R$^2$, with the passage N therein, substantially as and for the purpose set forth.

7. The bridge D, having an air conveying tube, c, substantially as and for the purpose set forth.

8. The bridge D, having air-conveying tubes d, for passing air to the stone R' on one side, and the box Q on the other side, substantially as and for the purpose set forth.

9. The bridge D, with tubes c d, for the inlet of fresh air to the bridge, and tube e, for discharge of hot air therefrom, substantially as and for the purpose set forth.

AND. FERRARI.

Witnesses:
JOHN A. WIEDERSHEIM,
A. P. GRANT.